United States Patent [19]

McCallum et al.

[11] Patent Number: 4,679,060

[45] Date of Patent: Jul. 7, 1987

[54] IONIC PRINT CARTRIDGE AND PRINTER

[76] Inventors: Robert S. McCallum, R.R. #1, Terra Cotta, Ontario, Canada, L0P 1N0; Paul E. Plasschaert, R.R. #1, Limehouse, Ontario, Canada, L0P 1H0; Dolf Landheer, 26 Euclid Avenue, Ottawa, Ontario, Canada, K1S 2W3; Hemant M. Gandhi, #12, 60 Wasdale Crescent, Toronto, Ontario, Canada, M6A 1W8

[21] Appl. No.: 675,664

[22] Filed: Nov. 28, 1984

[30] Foreign Application Priority Data

Dec. 9, 1983 [CA] Canada .................................. 442946

[51] Int. Cl.[4] ............................................ G01D 15/06

[52] U.S. Cl. ..................................... 346/159; 400/119

[58] Field of Search ................... 346/159, 155, 139 C; 400/119; 101/DIG. 13; 250/423 R-427; 365/118; 315/111.81; 428/137

[56] References Cited

U.S. PATENT DOCUMENTS 4,381,327 4/1983 Briere .................................. 428/137

4,408,214 10/1985 Fotland et al. ...................... 346/159

*Primary Examiner*—A. Evans

*Attorney, Agent, or Firm*—Rogers & Scott

[57] ABSTRACT

In one of its aspects the invention provides an ionographic print cartridge for use in placing discrete dots of electrostatic charge on a drum to build a latent image for subsequent toning. The print cartridge includes a substrate of a dielectric material having sufficient rigidity to resist deformation during assembly; driver electrodes printed on the substrate and consisting of parallel conductors extending longitudinally and having lead portions terminating at the conductors and extending generally transversely from ends of the conductors for making electrical connections to the driver electrodes. A dielectric layer covers at least the conductors with the conductors at a first side of the layer, and finger electrodes are positioned at the opposite side of the dielectric layer. The finger electrodes define edge structures straddling the driver electrodes and having individual contacts at the sides of the driver electrodes for making electrical connections to the finger electrodes. A method of manufacture is also described.

8 Claims, 5 Drawing Figures

IONIC PRINT CARTRIDGE AND PRINTER

This invention relates to ionographic printers and more particularly to ionographic print cartridges used in such printers.

Ionographic printers are becoming more accepted as need arises for equipment which can accept a computer or word processor output and convert the output to an image on paper. Typically a printer of this type uses an ionographic print cartridge which depends on a combination of electrodes which can be controlled to place an electrostatic charge on a drum coated for instance with aluminum oxide impregnated with a wax. In this way latent images are built up corresponding to the image to be produced on the paper and this image is then toned and transferred to the paper and fused. Should it be necessary to produce a second copy, the procedure is repeated and so on to give as many copies as necessary. Further, it is possible to vary the image by electronic control so that parts of the image can be printed, or the complete image can be turned through 90° with respect on the paper. All of these variations are possible making ionographic printers desirable equipment where hard copies of information are required.

Various attempts have been made to produce print cartridges commercially and economically. One of the earliest descriptions of a basis for modern print cartridges is shown in U.S. Pat. No. 4,155,093 to Fotland and Carrish. This patent describes a structure using two sets of electrodes and an improvement to this is described in subsequent U.S. Pat. No. 4,160,257 to Carrish. This latter patent teaches the use of screen electrode to improve the definition of the pattern of electrostatic charge on the drum.

With respect to the manufacture of cartridges, U.S. Pat. No. 4,381,327 to Briere describes the lamination of mica used as a dielectric to two sets of electrodes which are laminated one to either side of the mica.

While the cartridges described in the foregoing patents have been used successfully, a demand has arisen for a cartridge which is easier to make, less costly and which obviates the problems associated with dielectrics such as mica. This is primarily because of difficulties encountered in the production of prior art cartridges. It is desirable that the resulting cartridge provide individual dots in a matrix, with all of the dots produced in similar circumstances with similar electrical current densities. It has been found that variations in hole sizes and thickness of the laminate containing the electrodes results in different discharges with varying results. Further, during the manufacturing process the electrodes are first laid on the mica dielectric and the rest of the cartridge is built up from this initial step. There are numerous disadvantages in this procedure not the least of which is the fact that the mica is handled continuously without stiff support. Consequently the mica is made to flex and it is not uncommon for a finished cartridge to fail because of cracks in the mica. Also, as the laminate is built up, any flexing stresses the layers and this also can cause breakdown.

A further disadvantage of previous methods is simply the need for a large piece of dielectric, particularly mica which is both expensive and in short supply. It is therefore desirable to minimize the size of the dielectric and to ensure that it is supported as fully as possible during the manufacture of the cartridge.

It is therefore one of the objects of the present invention to provide a method of making an ionographic print cartridge which ensures high success to failure ratio.

It is a further object to provide a print cartridge the design of which lends itself to repetitive and simplified manufacturing techniques and which is less costly to manufacture.

In one of its aspects the invention provides an ionographic print cartridge for use in placing discrete dots of electrostatic charge on a drum to build a latent image for subsequent toning. The print cartridge includes a substrate of a dielectric material having a sufficient rigidity to resist deformation during assembly; driver electrodes printed on the substrate and consisting of parallel conductors extending longitudinally and having lead portions terminating at the conductors and extending generally transversely from ends of the conductors from making electrical connections to the driver electrodes. A dielectric layer covers at least the conductors with the conductors at a first side of the layer and finger electrodes are positioned at the opposite side of the dielectric layer. The finger electrodes define edge structures straddling the driver electrodes and having individual contacts at the sides of the driver electrodes for making electrical connections to the finger electrodes.

This and other aspects of the invention will be better understood with reference to the drawings, in which.

Figure 1:
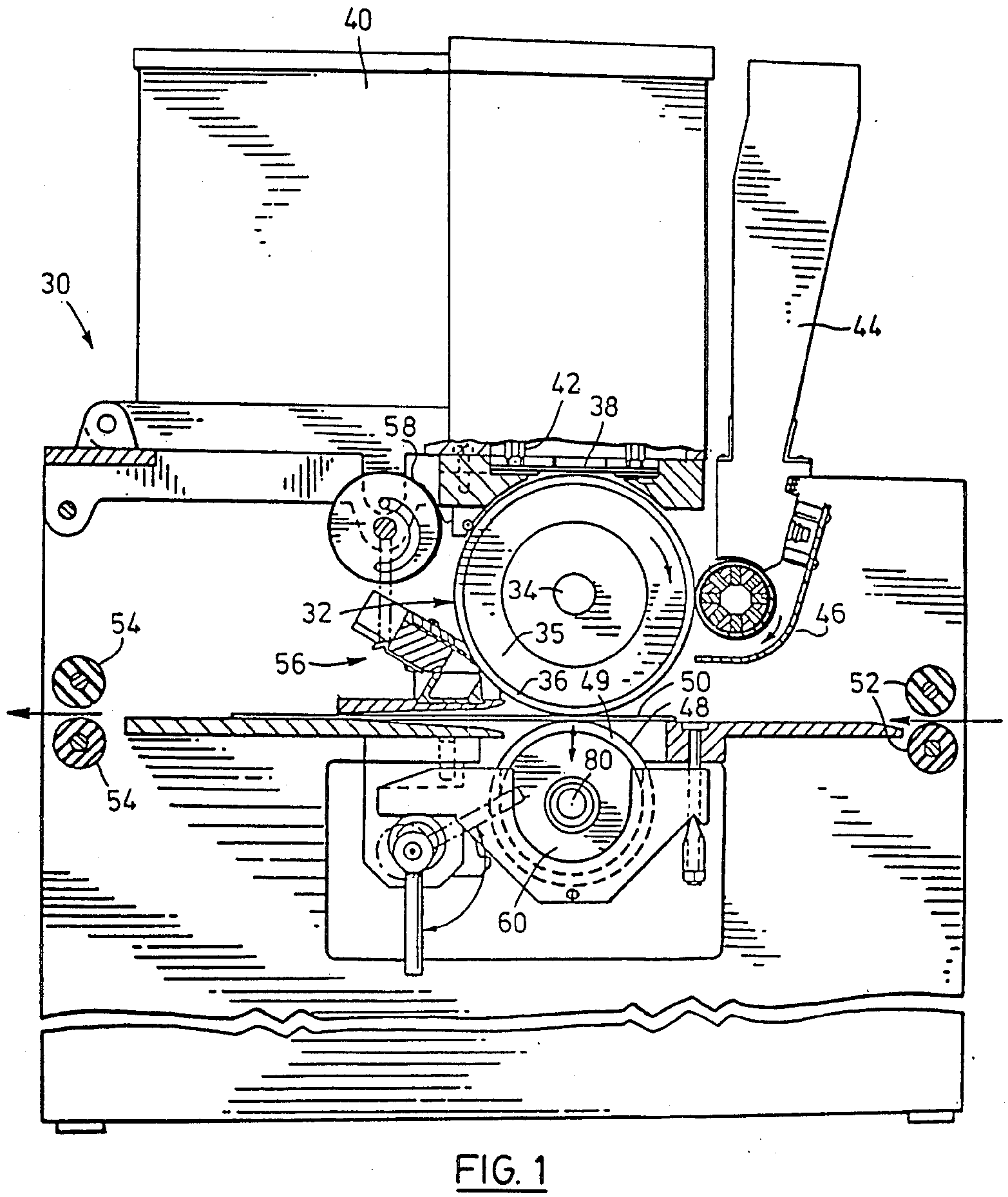
FIG. 1 is an exemplary ionographic printer containing an ionographic print cartridge according to the invention.

Reference is made first to FIG. 1 which shows somewhat schematically an ionographic printer 30 incorporating a preferred embodiment of print cartridge according to the invention. This printer is illustrated primarily to demonstrate a preferred environment for the invention but other printers could benefit from the use of the invention. A cylinder 32 is mounted for rotation about an axis 34 and has an electrically conductive core 35 coated in a dielectric layer 36 capable of receiving an electrostatic image from an ionographic print cartridge 38 driven by an electronic control system 40 and connected by electrical connectors 42. As the cylinder rotates in the direction shown, an electrostatic image in the form of a dot matrix is created by the cartridge 38 on the outer surface of the dielectric layer 36 and comes into contact with toner supplied from a hopper 44 by a feeder mechanism 46. The resulting toned image is carried by the cylinder 32 towards a nip formed with a pressure roller 48 having a compliant outer layer 49 positioned in the path of a receptor such as a paper 50 which enters between a pair of feed rollers 52 driven by the cylinder 32 and roller 48. The paper leaves between a pair of output rollers 54. The pressure in the nip is sufficient to cause the toner to transfer to the receptor 50 and, because the axes of the cylinder 32 and roller 48 lie at an angle of about 45 minutes to one another, the toner will be fused to the receptor. It has been found that the angle can be varied in the range 30 minutes to 2 degrees depending upon the rollers, paper, etc.

After passing through the nip between the cylinder 32 and the roller 48, any toner remaining on the surface of the dielectric layer 36 is removed by a scraper blade assembly 56, and any residual electrostatic charge remaining on the surface is neutralized by a discharge head 58 positioned between the scraper blade assembly 56 and the cartridge 38.

Figure 3:
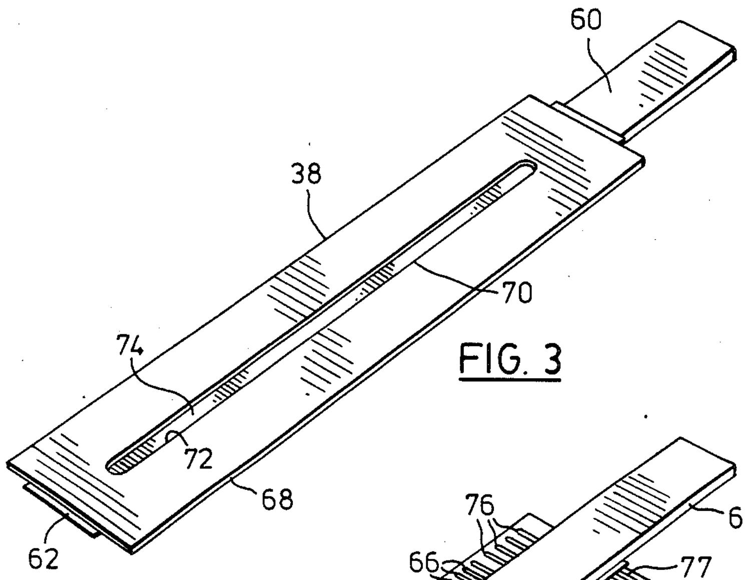
FIG. 3 is a view similar to FIG. 2 but drawn from the other side of the cartridge.
Figure 2:
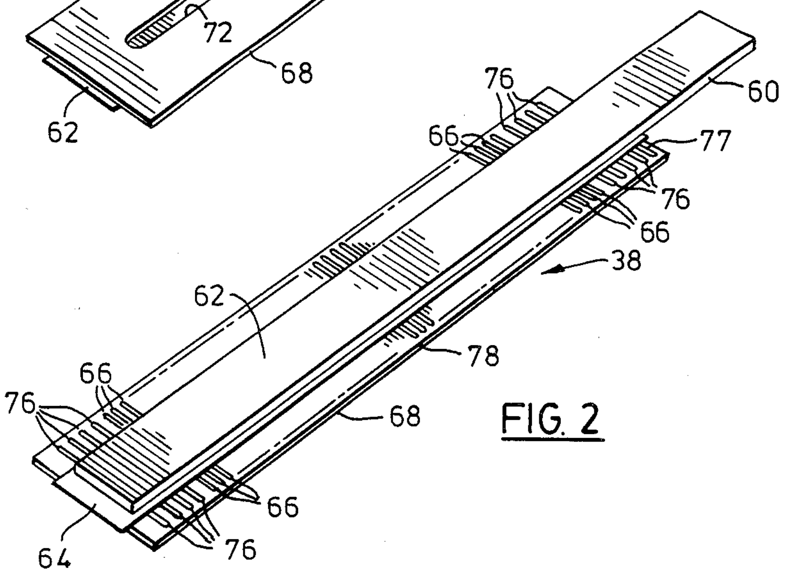
FIG. 2 is a perspective view of a typical ionographic print cartridge according to the invention and drawn from the top of the cartridge with respect to its position in FIG. 1.

Reference is next made to FIG. 2 which illustrates the preferred embodiment of ionographic print cartridge 38. In this view, the cartridge is shown generally from the top as it would appear in the printer of FIG. 1 with a handle 60 extending beyond the active part of the cartridge for engaging the cartridge in the printer. The handle is extension of a rigid spine 62 of aluminum which extends beyond the cartridge to form the handle 60. The spine is separated from the discharge portion of the cartridge by a spacer layer 64 of dielectric material. Contacts 66 can be seen extending to either side of the spine 62 supported by a bottom board 68 which is better seen in FIG. 3. This board has a central slot 70 positioned about angled rows of small openings 72 in a screen 74.

Returning to FIG. 2, the contacts 66 are spaced equally down the sides of the spine for making individual electrical connections to the finger electrodes. Similarly contacts 76 provide for connections to driver electrodes or driver lines, and a single contact 77 is provided for the screen 74. Details of the construction of the cartridge will be described with reference to subsequent drawings but for the moment it is sufficient to understand that individual discharges are created at locations corresponding to each of the openings in the rows 72 by energizing selected finger electrodes 66, and driver electrodes which maintain a bias on the screen.

Figure 4:
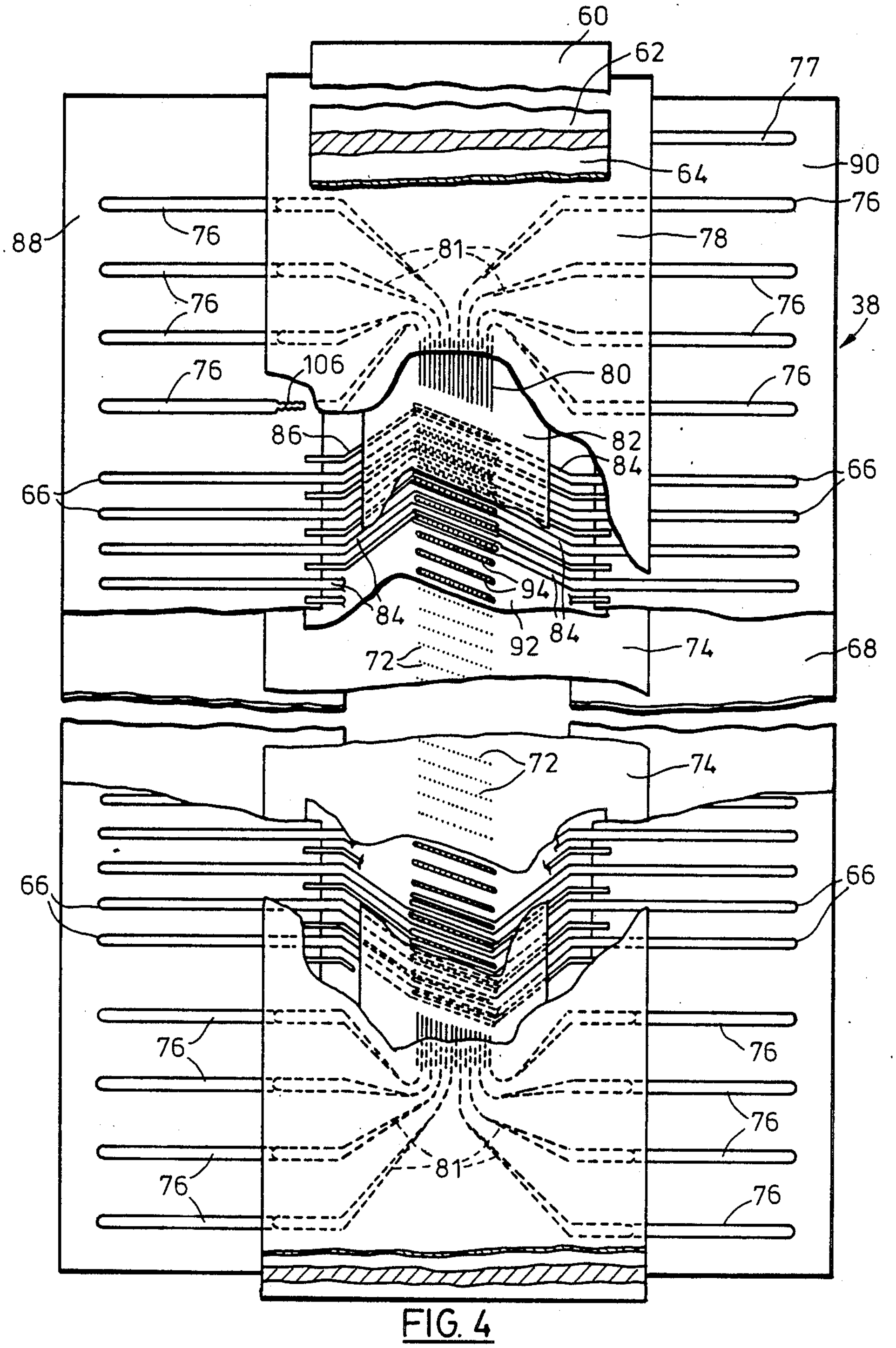
FIG. 4 is a view with layers broken away of the cartridge drawn from above the cartridge to show the various layers and their relationships.

The general arrangement of the laminates forming the cartridge will first be described with reference to FIG. 4 followed by a detailed description of the preferred method of manufacture with reference to FIG. 5. As seen in FIG. 4, which is drawn from above the cartridge with parts of layers removed, the spine 62 is attached to the spacer layer 64 and this, in turn, is attached to a printed circuit board 78. This board, or substrate, has printed on its underside sixteen driver electrodes or drive lines indicated collectively by the numeral 80. Ends of the print driver electrodes terminate at printed lead portions 81 which make mechanical contact with inner ends of the contacts 76 as will be described. The driver electrodes are parallel and separated by a strip of mica 82 from finger electrodes 84. Each of these finger electrodes defines a slot having edge structures and terminates in a support piece such as piece 86 for maintaining the finger electrodes in relationship to one another during the manufacturing process as will be described. Also, the contacts 66 and pieces 86 are formed integrally with the finger electrodes and the contacts and ends of the pieces are adhered to two parallel strips of dielectric tape, 88, 90 preferably KAPTON (a trade mark of DupPont) for maintaining the spaced relationship of the contacts.

Below the finger electrodes 84 is a separator layer 92 having parallel slots 94 located in alignment with the slots in the finger electrodes where electrostatic discharge takes place in the manner described in the aforementioned U.S. patents. The layer 92 is positioned on the screen 74 having the rows of openings 72 mentioned previously with reference to FIG. 3. Also, the layer falls short of screen contact 77 so that an inwardly extending end of this contact is touching the screen so that it can be spot welded to the screen.

The above description of FIG. 4 gives an overview of the arrangement of the various layers in the cartridge 38. Of course, it will be appreciated that layers of adhesive and the like have been omitted for clarity.

Figure 5:
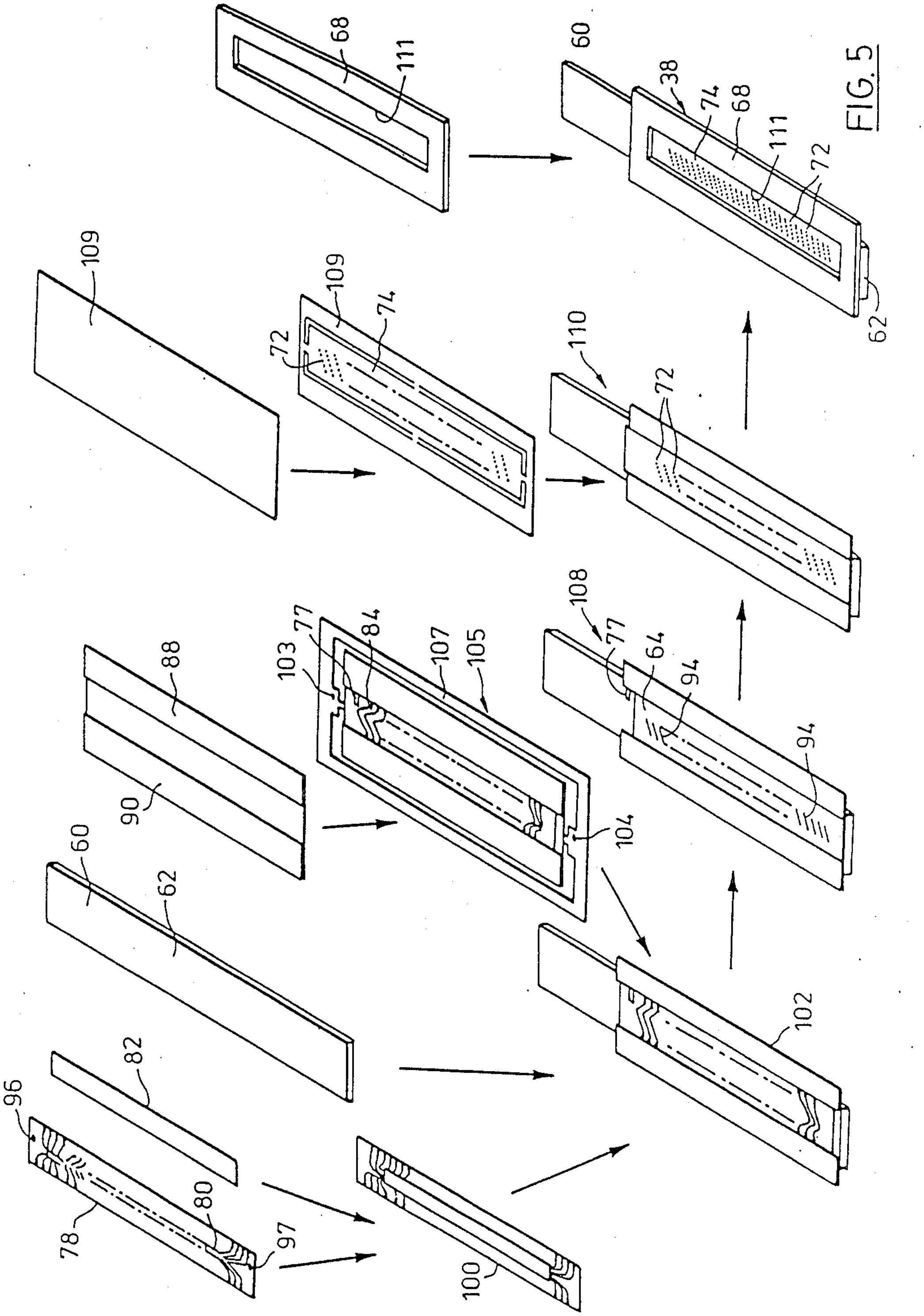
FIG. 5 is a diagrammatic illustration of the steps of the method of making the cartridge according to a preferred method.

In order to understand how the cartridge is made, reference is made to FIG. 5 which illustrates the various parts and how they come together during the assembly operation. The assembly starts from the top left hand corner and new parts are introduced from the top into sub-assemblies shown along the bottom and ending with cartridge 38 at the bottom right of the Figure.

Firstly, the printed circuit board 78 is prepared using a substrate of fibreglass reinforcing epoxy and having on the upper side as drawn the driver electrodes 80 and associated lead portions used to connect the drive lines to the contacts 76 electrically. The board has adjacent its ends a pair of location holes 96, 97 offset from the centre of the board and used to align this with other parts during the assembly as will be described. The copper printing on the board must be inspected to ensure that there are no breaks in the driver electrodes and no shorts between them. Any stray copper islands existing on the board must be identified and removed and the printed copper must be free of wrinkles, pits and scratches. Once this board is prepared, the strip of mica 82 is then prepared ready for assembly with the board. Typically the mica is 0.75 inches wide by 9.5 inches long and 0.0005 inches thick.

A clip is attached to one end of the mica for handling during processing and using the clip, the mica is inserted for five minutes first in a warm detergent solution and then in distilled water. Finally it is washed in a weak solution of hydrochloric acid and again rinsed thoroughly. Once this preparation is complete, the mica is attached to the printed circuit board 78 over the drive lines 80 using an ultra-violet curable epoxy adhesive. The adhesive is positioned and then the parts squeezed together to ensure that a uniform coating is provided and also to impregnate the adhesive between the individual driver electrodes. This step is important to eliminate trapped air which could have an effect on the peformance of the finished cartridge. The sub-assembly so formed is indicated by numeral 100 and is then treated before further assembly by submerging in a silicone pressure sensitive adhesive, preferably DENSIL (a trade mark of Dennison Manufacturing Co.) and then withdrawing slowly to ensure a complete coating of DENSIL on the sub-assembly.

Next the spine 62 is prepared for assembly with sub-assembly 100 to create a second sub-assembly 102. The spine is typically of aluminum and is 1.375 inches wide, 14 inches long and 0.185 inches thick. The surface to be attached to the sub-assembly 100 must be as flat as possible and have a variation along its length of no more than 0.0002 inches. Once the spine has been inspected, a layer of double-sided adhesive tape is placed on the flat surface of the spine (but not on the handle 60) and the tape is trimmed from the edges of the spine. The sub-assembly 100 and the spine are then ready to be included in a second sub-assembly 102. However, before this can be done, the finger electrodes 84 must be prepared.

The finger electrodes are made from a piece of stainless foil 0.001 inches thick, about 12 inches long and 6 inches wide. The piece of stainless steel is not shown on its own in FIG. 5 but is shown after the next step when the two strips of dielectric KAPTON tape 88, 90 have been attached. The stainless steel is of course cleaned thoroughly using de-ionized water, a weak solution of hydrocloric acid, and drying in a lamina flow hood. The two strips of KAPTON tape are placed about 1.25 inches apart with the outer edges of the tape about 0.4 inches from the edge of the stainless foil. Suitable tape will be about 1.5 inches wide by 0.002 inches thick.

After the KAPTON tape has been attached, films of dry film photoresist, preferably RISTON 3315 (a trade mark of DuPont) 6 inches wide are attached one to each side of the stainless foil and KAPTON tape. After this has been done, excess photoresist is trimmed short of the steel edges of the foil and the sub-assembly so formed is kept in a dark environment for a minimum of 15 minutes. The photo-resistive photoresist serves to permit etching of the finger electrodes. Firstly, the desired pattern is exposed onto both sides of the photoresist coated stainless steel and, after storing the exposed laminate for a minimum of 15 minutes, it is developed and etched resulting in the sub-assembly 105.

The finger electrodes 84 contained in the sub-assembly 105 the contacts 66, 76 on the underside as drawn in FIG. 5. As described with reference to FIG. 4, the contacts 66 are integral with the fingers whereas the contacts 76 must be connected to the lead portions 81 of the printed circuit board 78. This is done by providing contacts 76 on the KAPTON tape so that they underlie the printed circuit board. The contacts 76 are pressed locally at their inner ends to form upstanding corrugated edges as shown at 106 on one of the contacts drawn to the top left of FIG. 4. Consequently when the sub-assembly 102 is made, these upstanding edges penetrate the DENSIL and make contact with the respective lead portions 81 on the printed circuit board to provide electrical connection to the drive lines 80.

Returning to FIG. 5, the next sub-assembly 102 is made by combining the first sub-assembly 100 with the spine 62 and with the finger sub-assembly 105. These parts are engaged in a suitable jig using for location the pair of openings 96, 97 and corresponding openings 103, 104 which were etched in a framework 107 formed about the finger electrodes. The spine is located separately using shoulders in the jig. After the parts are positioned, they are pressed together in the jig and the resulting assembly is held together by the DENSIL adhesive. Conveniently the jig can be arranged to be double acting so that it initially presses the parts together and then strips the excess framework 107 appearing in the sub-assembly 105 and generally trims the new sub-assembly 102.

Once the sub-assembly 102 is completed, it is tested electrically to ensure proper continuity of the individual driver electrodes and finger electrodes. Next, the spacer layer 64 is laid on the sub-assembly 102. Initially a layer of liquid solder mask (preferably MACU-MASK, a solder resist by MacDermid) is screen printed over the finger electrodes to effectively seal the electrodes in place. This layer is about 0.001 inches thick and is cured under ultra-violet light. Next, a layer of dry film solder mask, preferably VACREL (a trade mark of DuPont) 0.004 inches thick is laid over the layer of liquid solder mask using a vacuum laminator. This layer does not extend to the screen contact 77 so that this contact is available for welding to the screen 74. The VACREL spacer layer is exposed using art work which shields the slots 94 so that after exposure, the VACREL can be developed to remove these slots. Next, because there may be some debris contained in the slots, the new sub-assembly 108 is subjected to a high pressure blast of liquid freon directed into the slots to remove any particles remaining in the slots. This is necessary to ensure that the slots in the finger electrodes are sufficiently clean to expose edges of the finger electrodes to provide electrostatic discharge at the intersections of the driver electrodes and the inner edges of the slots of the finger electrodes and to remove the previously applied DENSIL adhesive from the surface of the mica within the slots of the finger electrodes.

The spacer layer 64 is necessary to provide separation between the finger electrodes and the screen 74. As demonstrated in the aforementioned U.S. patent to Fotland and Carrish, a cartridge is usable in a form having the driver electrodes and the finger electrodes without a screen. However, as taught by the patent to Carrish, an improvement is to include the screen 72 which is next added to the sub-assembly.

As seen in FIG. 5, a piece of stainless steel foil 109, of similar material to that used for the finger electrodes, is prepared for etching in a manner similar to that used for the finger electrodes. The result is the screen 74 contained in a frame 109 which is removed so that screen can be attached to the sub-assembly 108 to form a new sub-assembly 110. The attachment is made using a thin layer of silicon adhesive on the spacer layer having sufficiently low viscosity to allow the assembler to position the screen on the sub-assembly 108 and visually align the rows of openings 72 with the finger electrodes under a microscope to each row of openings over the slot in a corresponding one of the finger electrodes. Some slight variation is of course possible but ideally the rows of openings would be centered over the corresponding slots. Once the adhesive has set, the screen is spot welded to the contact 77.

The last sub-assembly 110 leads to the finished cartridge 38 which consists of the sub-assembly 110 with the bottom board 68 attached. This board is of fibreglass reinforced epoxy having a thickness of 0.060 inches and defines a wide slot 111 which on assembly is positioned with the rows of openings 72 centered. The board is attached using double-sided adhesive tape which entirely covers the top surface of the board so that it is attached to the KAPTON tape as well as to the ends of the spacer layer 64. As a result, the board provides a support for the tape and contacts which are adhered to the tape to minimize the possibility of damaging these parts.

In use, the cartridge 38 is placed in the printer with the bottom board 68 face down and resting on locating ledges in the printer with the board in face-to-face relationship with these ledges. Electrical connectors are brought down into engagement with the contacts and pressure is applied to make good connections. Consequently it is essential that the contacts of the cartridge be maintained in fixed relationship relative to one another and to be supported to avoid damage when these forces are applied.

Other materials are of course available for use as dielectrics, adhesives, etc., within the scope of the invention method and apparatus.

We claim:

1. An ionographic print cartridge for use in placing discrete dots of electrostatic charge on a drum to build a latent image for subsequent toning, the print cartridge comprising:

a substrate of a dielectric material having sufficient rigidity to resist deformation during assembly;

driver electrodes printed on the substrate and consisting of parallel conductors extending longitudinally and lead portions terminating at the conductors and extending generally transversely from ends of the conductors for making electrical connections to the driver electrodes;

a dielectric layer covering at least the conductors so that the conductors are at a first side of the layer;

finger electrodes at the opposite side of the dielectric layer, the finger electrodes defining edge structures straddling the driver electrodes and having individual contacts to the sides of the driver electrodes for making electrical connections to the finger electrodes.

2. A cartridge as claimed in claim 1 and further comprising:

a dielectric spacer layer covering the finger electrodes;

a screen over the spacer layer, the screen defining rows of discrete openings in alignment with the finger electrode edge structures to better control individual electrostatic charges for improved transfer of the dot charges to the drum.

3. A cartridge as claimed in claim 1 and further comprising:

a stiff spine attached to the substrate to rigidify the cartridge.

4. A cartridge as claimed in claim 1 and further comprising:

a pair of parallel insulating strips adhered to said contacts to maintain the contacts in spaced relationship; and further contacts attached to the strips and overlapping outer ends of said lead portions, said outer ends being deformed to form upstanding edges in physical engagement with the further contacts whereby said electrical connections to the driver electrodes are made at the further contacts.

5. A cartridge as claimed in claims 1 in which the dielectric layer is mica.

6. A cartridge as claimed in claim 4 in which each of the electodes comprises:

a central portion defining an elongate slot spanning the driver electodes and defining said edge structure, the central portion being connected to one of its ends to a corresponding one of said contacts on one of the insulating strips; and an extension piece attached to the central portion at the other of its ends and having an end attached to the other of the insulating strips for better support of the central portion.

7. An ionographic print cartridge for use with a dielectric coated drum to lay electostatic images on the drum for subsequent toning, the cartridge comprising:

a printed circuit board carrying parallel driver electrodes extending longitudinally;

a dielectric layer over the driver electrodes;

finger electrodes separated from the driver electrodes by the dielectric layer;

strips of dielectric material spaced to either side of the driver electrodes; and electrical contact means coupled to the driver and finger electrodes and supported by the strips.

8. A cartridge as claimed in claim 7 and further comprising a stiff spine attached to the printed circuit board to rigidify the cartridge.

* * * * *